July 2, 1940.                W. E. WILLIAMS                2,206,797
                       MAKING DIES FOR PLASTIC LENSES
                            Filed May 4, 1937
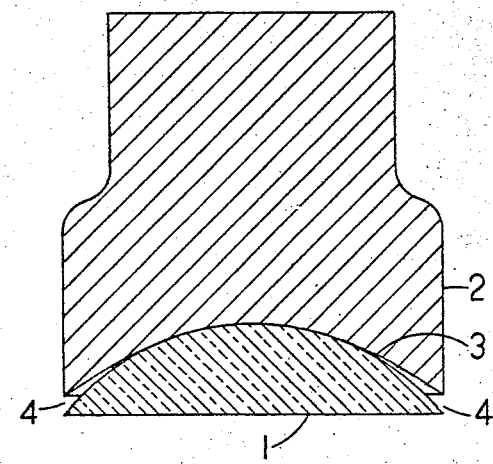
INVENTOR
WILLIAM E. WILLIAMS
By Norris & Bateman
ATTORNEYS Patented July 2, 1940

2,206,797

UNITED STATES PATENT OFFICE 2,206,797

MAKING DIES FOR PLASTIC LENSES

William Ewart Williams, Hampstead, London, England

Application May 4, 1937, Serial No. 140,710
In Great Britain May 7, 1936

1 Claim. (Cl. 76—107)

This invention relates to the manufacture in accordance with British Letters Patent No. 416,398, of lenses, mirrors and similar precision devices of an optical nature essentially composed mainly of what is commonly called "plastic glass" which may be a synthetic resin of which several forms of a suitable nature are known, namely which can be moulded to the required spherical, prismatic or other optical shape or form by hot-pressing at moderate temperature between optically polished dies.

In such manufacture the resultant curvatures of the surfaces of the lens or mirror or the like at room or ordinary temperatures do not exactly coincide with those of the optical dies used in the moulding process since the surfaces of the die and of the moulded component are cooled more rapidly than the inner portions thereof, and the defect becomes evident, more particularly in the manufacture of large aperture ratio optical systems required to have a high standard of definition.

An object of the invention is the manufacture of large aperture ratio optical lenses and the like having a high standard of definition.

Another object of the invention is the manufacture of aspherical lenses and the like whereby to avoid the several aberrations, other than chromatic, that can only be compromised with when spherical lenses and the like are employed, whilst a high standard of definition is obtained with a single component lens or the like.

According to one feature of this invention, one or each of the optically polished dies is worked by local polishing so that its surface or surfaces is or are no longer spherical or plane but has or have such shape that the resultant lens or mirror or the like has the desired spherical or plane surface or surfaces.

According to another feature of the invention, the optical dies are worked by local polishing so that the resultant moulded lens is definitely aspherical. In this way, the several optical aberrations (other than chromatic) that can only be compromised with when spherical surfaces are employed, can be eliminated and a high standard of definition obtained with a single component lens.

In either case the amount and position of the local polishing required can be determined by a study of the deformations of the finished lens or mirror, either by interferometric or other optical testing methods, such as hereinafter described in detail.

Referring to the accompanying explanatory drawing, the single figure thereof shows at 1 a plano-convex lens by way of example and at 2 is shown one of the two dies from which the lens 1 is formed, the counterpart die being for simplicity omitted. The illustrated lens 1 is supposed to have a truly spherical upper face whilst the optically polished face 3 of the die is assumed to be aspherical, as is indicated to a highly exaggerated degree by the space 4 between these faces, according to which of the two features of the invention hereinbefore indicated is in question. Thus space 4 may represent the portion of the die surface which has been polished away so as to provide a finally resulting truly spherical upper surface on the lens 1. In the moulding of aspherical lenses, the die will of course be given approximately that aspherical shape, corrected also if desired in respect of the other feature of the invention, namely, for non-uniform cooling effects.

In carrying out the invention, a lens for example, which has been moulded from spherical die surfaces by a fixed process, is mounted in a lens testing interferometer such as is described in my copending British application No. 12,867/1936, and the deformations of the wavefront from its ideal shape assessed or determined. If in a given region or zone of the lens the observed error is $X$ wave length, the correction $t$ required in the surface of the lens is given by $2t(\mu-1)=X$ where $\mu$ is the refractive index of the material. Since the corrections usually required are only of the order of a few wave lengths of light it is often sufficiently accurate to write $t=X$.

If now the die is mounted as one mirror of the lens testing interferometer aforesaid and is perfectly spherical, no fringes will be seen. A local deformation of $y$ wave length units will produce a fringe displacement of $2y$ fringes. Hence it is only necessary locally to polish the optical die until it gives under interferometric test half the number of bands given by the original lens moulded from spherical dies. The correction must of course be in the opposite sense.

In the appended claim it is to be understood that the word "lens" is to include within its meaning, mirrors, prisms and like devices of an optical nature.

I claim:

For the production of "synthetic glass" lenses of wide aperture ratio and having predetermined surface shapes imparted to them to a high degree of optical precision, the manufacture of a die, which consists in first producing on a metal die member a polished surface of a shape corresponding as nearly as practicable to the exact predetermined optical shape of the required lenses, then moulding with said die member at least one preliminary lens by hot pressing at the appropriate temperature a mass of thermoplastic "synthetic glass" material, mounting said preliminary lens in a lens testing interferometer and noting by the fringes the departure of the shape of said lens from a standard lens system which has the exact predetermined shape required, substituting said die member for said preliminary lens in said interferometer and noting the fringes if any, and then locally polishing the die surface in accordance with the fringe notations but reversely with respect thereto until the die surface gives half the number of fringes as does said preliminary lens.

WILLIAM EWART WILLIAMS.